US012729717B2

(12) United States Patent
Arai

(10) Patent No.: US 12,729,717 B2
(45) Date of Patent: Sep. 8, 2026

(54) SLIDING COMPONENT

(71) Applicant: EAGLE INDUSTRY CO., LTD., Tokyo (JP)

(72) Inventor: Minehiro Arai, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 74 days.

(21) Appl. No.: 18/284,281

(22) PCT Filed: Mar. 17, 2022

(86) PCT No.: PCT/JP2022/012342

§ 371 (c)(1),
(2) Date: Sep. 26, 2023

(87) PCT Pub. No.: WO2022/209965

PCT Pub. Date: Oct. 6, 2022

(65) Prior Publication Data

US 2024/0167509 A1 May 23, 2024

(30) Foreign Application Priority Data

Mar. 30, 2021 (JP) ................................ 2021-057271

(51) Int. Cl.
*F16C 33/16* (2006.01)
*F16C 17/12* (2006.01)

(52) U.S. Cl.
CPC ............. *F16C 33/16* (2013.01); *F16C 17/12* (2013.01)

(58) Field of Classification Search
CPC .. F16C 33/16; F16C 17/12; F16J 15/34; F16J 15/3404; F16J 15/3496
See application file for complete search history.

(56) References Cited

U.S. PATENT DOCUMENTS

RE24,651 E * 5/1959 Anderson .............. F16L 21/05 277/626
3,085,808 A 4/1963 Williams ..................... 277/388
3,232,680 A 2/1966 Clark ........................... 384/110
3,410,565 A 11/1968 Williams ..................... 277/348
(Continued)

FOREIGN PATENT DOCUMENTS

CN 1364987 8/2002 .............. F16J 15/40
CN 2534429 2/2003 .............. F16J 15/40
(Continued)

OTHER PUBLICATIONS

PCT International Search Report, Written Opinion and International Preliminary Report on Patentability issued in PCT/JP2022/034390, dated Nov. 22, 2022 with English Translation, 24 pages.
(Continued)

*Primary Examiner* — Gilbert Y Lee
(74) *Attorney, Agent, or Firm* — HAYES SOLOWAY P.C.

(57) ABSTRACT

Provided is a sliding component capable of obtaining a stable low-friction effect in a wide range of conditions of use. Sliding components have sliding surfaces sliding relative to each other. A base material of the sliding component is directly coated with a thin film mainly made of graphite, the sliding surface is formed by the thin film, and the thin film contains fillers with dimensions equal to or less than the thickness of the thin film.

2 Claims, 5 Drawing Sheets

(56) References Cited

U.S. PATENT DOCUMENTS 3,466,052 A 9/1969 Ludwig
3,499,653 A 3/1970 Gardner .......................... 277/27
3,527,465 A 9/1970 Guinard ........................ 277/400
3,656,227 A 4/1972 Weinand ......................... 29/530
3,675,935 A 7/1972 Ludwig .................. F16J 15/342
3,782,737 A 1/1974 Ludwig
3,804,424 A 4/1974 Gardner .......................... 277/27
3,855,624 A 12/1974 Reinhoudt ............ F16C 17/045
3,870,382 A 3/1975 Reinhoudt ............ F16C 17/045
4,406,466 A 9/1983 Geary, Jr. ..................... 277/347
4,486,026 A 12/1984 Furumura et al. .............. 277/80
4,523,764 A 6/1985 Albers ................... F16J 15/342
4,645,414 A 2/1987 DeHart ................. F04D 17/161
5,092,612 A 3/1992 Victor .......................... 277/400
5,133,562 A 7/1992 Lipschitz ............... F16J 15/342
5,201,531 A 4/1993 Lai ....................... F16J 15/3412
5,222,743 A 6/1993 Goldswain .................... 277/400
5,385,409 A 1/1995 Ide ....................... F16J 15/3432
5,441,283 A 8/1995 Pecht et al. .................. 277/96.1
5,447,316 A 9/1995 Matsui ..................... F16J 15/34
5,492,341 A 2/1996 Pecht ........................... 277/400
5,496,047 A 3/1996 Goldswain ........... F16J 15/3412
5,498,007 A 3/1996 Kulkarni ....................... 277/366
5,501,470 A 3/1996 Fuse ............................ 277/400
5,529,318 A 6/1996 Fuse .................... F16J 15/3412
5,556,111 A 9/1996 Sedy ........................... 277/96.1
5,605,339 A 2/1997 Pecht ................... F16J 15/3412
5,664,787 A 9/1997 Fuse et al. ............... F16J 15/34
5,702,110 A 12/1997 Sedy
5,895,051 A 4/1999 Bowers .................... B62D 5/22
6,142,478 A 11/2000 Pecht ................... F16J 15/3484
6,189,896 B1 2/2001 Dickey et al. .......... F16L 17/06
6,446,976 B1 9/2002 Key ............................. 277/367
6,575,470 B1 6/2003 Gacek .................. F16J 15/3412
6,817,766 B2 11/2004 Gomyo .................. F16C 32/06
7,044,470 B2 5/2006 Zheng .................... F16J 15/342
7,510,330 B2 3/2009 Obara ..................... F16C 32/06
7,568,839 B2 8/2009 Gotoh et al. ............ F16C 32/06
7,744,094 B2 6/2010 Yanagisawa ........... F16J 15/342
7,758,051 B2 7/2010 Roberts-Haritonov et al. ............ F16J 15/34
7,780,399 B1 8/2010 Garrison ............... F01D 25/183
8,162,322 B2 4/2012 Flaherty ............... F16J 15/3412
9,062,775 B2 6/2015 Short et al. .............. F16J 15/34
9,353,865 B2 5/2016 Lattin ..................... F16N 21/00
9,353,867 B2 5/2016 Itadani ................... F16J 15/342
9,371,912 B2 6/2016 Hosoe et al. ............ F16J 15/34
9,587,745 B2 3/2017 Itadani et al. ....... F16J 15/3412
9,611,938 B1 4/2017 Itadani ................. F16J 15/3416
9,677,670 B2 6/2017 Itadani et al. ........... F16J 15/34
9,829,109 B2 11/2017 Itadani et al. ....... F16J 15/3412
9,845,886 B2 12/2017 Itadani .................. F16C 17/045
9,951,873 B2 4/2018 Inoue et al. ............. F16J 15/34
9,982,784 B2 5/2018 Osada et al. ............. F16J 15/34
10,054,230 B2 8/2018 Katori ...................... F16J 15/34
10,072,759 B2 9/2018 Inoue et al. ............. F16J 15/34
10,113,648 B2 10/2018 Inoue et al. ........... F16J 15/342
10,190,689 B2 1/2019 Yoshida ............... F16J 15/3412
10,337,560 B2 7/2019 Takunaga ................ F16C 33/80
10,337,620 B2 7/2019 Tokunaga et al. ...... F16J 15/342
10,352,450 B2 7/2019 Yamanaka et al. .. F16J 15/3204
10,408,349 B2 9/2019 Miyazaki ............. F16J 15/3272
10,473,220 B2 11/2019 Tokunaga et al. ....... F16J 15/34
10,487,944 B2 11/2019 Itadani ................. F16J 15/3496
10,487,948 B2 11/2019 Inoue et al. ........... F16J 15/342
10,495,228 B2 12/2019 Itadani et al. ........... F16J 15/34
10,648,569 B2 5/2020 Itadani .................... F16K 15/34
10,655,736 B2 5/2020 Itadani ................. F16J 15/3416
10,704,417 B2 7/2020 Tokunaga et al. ...... F01D 25/16
10,781,924 B2 9/2020 Inoue et al. ........... F16J 15/342
10,883,603 B2 1/2021 Inoue et al. ........... F16J 15/342
10,883,604 B2 1/2021 Inoue et al. ........... F16J 15/342
11,009,072 B2 5/2021 Kimura et al. .......... F16J 15/34
11,009,130 B2 5/2021 Itadani ................. F16J 15/3284
11,125,335 B2 9/2021 Kimura et al. .......... F16J 15/34
11,221,071 B2 1/2022 Sasaki ..................... F16C 17/04
11,525,512 B2 12/2022 Kimura ................ F16J 15/3412
11,530,749 B2 12/2022 Kimura .................. F16J 15/441
11,603,934 B2 3/2023 Imura .................. F16J 15/3412
11,644,100 B2 5/2023 Kimura .................. F16J 15/324
11,739,844 B2 8/2023 Katori et al. ............ F16J 15/34
11,821,461 B2 11/2023 Ou et al. .................. F16J 15/34
11,821,521 B2 11/2023 Imura .................... F16J 15/342
11,852,241 B2 12/2023 Suzuki .................. F16C 33/106
11,892,081 B2 2/2024 Inoue et al. ............. F16J 15/34
12,049,962 B2 7/2024 Ou ....................... F16J 15/3256
12,188,516 B2 1/2025 Negishi ................. F16C 17/028
12,209,668 B2 1/2025 Imura ..................... F16C 33/74
2002/0093141 A1 7/2002 Wang ............................ 277/358
2003/0178781 A1 9/2003 Tejima
2003/0189294 A1 10/2003 Tejima ..................... F16J 15/34
2004/0080112 A1 4/2004 Tejima .......................... 277/306
2005/0064196 A1 3/2005 Martin et al.
2005/0135714 A1 6/2005 Rahman ................ F16C 17/107
2005/0141789 A1 6/2005 Kita et al. ............... F16C 32/06
2005/0212217 A1 9/2005 Tejima .......................... 277/399
2006/0093245 A1 5/2006 Han ................... G11B 19/2018
2007/0296156 A1 12/2007 Yanagisawa et al. ... F16J 15/34
2008/0100001 A1 5/2008 Flaherty ........................ 277/400
2008/0272552 A1 11/2008 Zheng ........................... 277/400
2010/0066027 A1 3/2010 Vasagar ........................ 277/350
2011/0101616 A1 5/2011 Teshima ........................ 277/358
2012/0018957 A1 1/2012 Watanabe ..................... 277/387
2013/0209011 A1 8/2013 Tokunaga ........... F16C 32/0633
2014/0203517 A1 7/2014 Ferris .................. F16K 15/3412
2015/0115537 A1 4/2015 Tokunaga ................ F16J 15/34
2015/0115540 A1 4/2015 Tokunaga ................ F16J 15/34
2015/0123350 A1 5/2015 Itadani .......................... 277/400
2015/0184752 A1 7/2015 Itadani ................. F16J 15/3412
2015/0226334 A1 8/2015 Itadani ................... F16J 15/342
2015/0240950 A1 8/2015 Takahashi .............. F16J 15/363
2015/0260292 A1 9/2015 Inoue et al. ........... F16J 15/342
2015/0377297 A1 12/2015 Tokunaga et al. .... F16C 33/748
2015/0377360 A1 12/2015 Itadani ................. F16J 15/3412
2016/0003361 A1 1/2016 Takahashi ............ F16J 15/3408
2016/0033045 A1 2/2016 Itadani et al. ....... F16J 15/3412
2016/0097457 A1 4/2016 Sun et al. ................ F16J 15/34
2016/0122682 A1* 5/2016 Kayser ................... C08K 3/013 508/126
2016/0252182 A1 9/2016 Itadani et al. ........... F16J 15/34
2017/0009889 A1 1/2017 Seki ..................... F16J 15/3272
2017/0114902 A1 4/2017 Itadani ................. F16J 15/3412
2017/0130844 A1 5/2017 Itadani ................. F16J 15/3412
2017/0167615 A1 6/2017 Itadani ................. F16J 15/3412
2017/0198814 A1 7/2017 Colombo et al. .... F16J 15/3412
2017/0234431 A1 8/2017 Katori et al. ........ F16J 15/3412
2017/0241549 A1 8/2017 Itadani ...................... F16J 15/40
2018/0010690 A1 1/2018 Itadani .................. F04D 29/129
2018/0051809 A1 2/2018 Yoshida ............. F16H 15/3412
2018/0058584 A1 3/2018 Miyazaki ............... F16J 15/164
2018/0073394 A1 3/2018 Tokunaga et al. .... F01D 25/183
2018/0128377 A1 5/2018 Tokunaga et al. ..... F16J 15/342
2018/0128378 A1 5/2018 Tokunaga et al. ..... F16J 15/342
2018/0135699 A1 5/2018 Takunaga ............... F16J 15/348
2018/0195618 A1 7/2018 Itadani ................... F16J 15/342
2019/0178386 A1 6/2019 Arai ..................... F16J 15/3496
2019/0285115 A1 9/2019 Negish .................. F16C 17/045
2019/0301522 A1 10/2019 Negishi et al. ....... F16C 17/026
2019/0376558 A1 12/2019 Kimura ................. F16C 33/743
2020/0182299 A1 6/2020 Kimura ................. F16C 17/026
2021/0054935 A1 2/2021 Kimura ................ F16J 15/3412
2021/0080006 A1 3/2021 Sasaki ...................... F16J 15/34
2021/0116029 A1 4/2021 Kimura .................. F16J 15/324
2021/0116030 A1 4/2021 Kimura
2021/0116032 A1 4/2021 Kimura .................. F16J 15/188
2021/0164571 A1 6/2021 Kimura ................ F16J 15/3412
2022/0010835 A1 1/2022 Inoue .................... F16C 17/045
2022/0056956 A1 2/2022 Imura .................. F16J 15/3412
2022/0099188 A1 3/2022 Imura .................. F16C 33/107
2022/0099189 A1 3/2022 Suzuki ................ F16C 33/1065
2022/0099190 A1 3/2022 Ou .......................... F16C 33/74
2022/0099191 A1 3/2022 Suzuki ................. F16C 33/103
2022/0120315 A1 4/2022 Ou .......................... F16J 15/34
2022/0128088 A1 4/2022 Suzuki ................ F16J 15/3412

(56) References Cited

U.S. PATENT DOCUMENTS

| | | | | |
|---|---|---|---|---|
| 2022/0145992 | A1 | 5/2022 | Miyazaki | F16C 33/107 |
| 2022/0275828 | A1 | 9/2022 | Inoue | F16J 15/3424 |
| 2022/0389961 | A1 * | 12/2022 | Arai | F16C 33/74 |
| 2023/0228292 | A1 | 7/2023 | Negishi | F16J 15/3416 |
| 2023/0235780 | A1 | 7/2023 | Negishi | F16J 15/3412 |
| 2023/0258184 | A1 | 8/2023 | Suzuki | F04C 29/00 |
| 2023/0391912 | A1 * | 12/2023 | Isaka | C08F 214/262 |
| 2024/0309910 | A1 | 9/2024 | Fukuda | F16J 15/3416 |
| 2024/0344555 | A1 | 10/2024 | Imura | F16J 15/3412 |
| 2025/0003496 | A1 | 1/2025 | Ou | F16C 33/74 |

FOREIGN PATENT DOCUMENTS

| | | | |
|---|---|---|---|
| CN | 1401924 | 3/2003 | F16J 15/16 |
| CN | 101749431 | 6/2010 | F16J 15/34 |
| CN | 101776152 | 7/2010 | F16J 15/48 |
| CN | 201582390 | 9/2010 | F16J 15/16 |
| CN | 103267132 | 8/2013 | F16J 15/54 |
| CN | 103732958 | 4/2014 | F16J 15/34 |
| CN | 103791097 | 5/2014 | F16J 15/34 |
| CN | 104019237 | 9/2014 | F16J 15/16 |
| CN | 104165229 | 11/2014 | F16J 15/40 |
| CN | 105683632 | 6/2016 | F04D 29/10 |
| CN | 106439037 | 2/2017 | F16J 15/34 |
| CN | 206017723 | 3/2017 | F16J 15/16 |
| CN | 107166036 | 9/2017 | F16J 15/16 |
| CN | 107532724 | 1/2018 | F16J 15/34 |
| CN | 107676484 | 2/2018 | F16J 15/3232 |
| CN | 108506494 | 9/2018 | F16J 15/34 |
| DE | 3619489 | 12/1987 | F16J 15/34 |
| DE | 4407453 | 9/1995 | F16C 17/08 |
| EP | 0637706 | 8/1993 | F16J 15/34 |
| EP | 0896163 | 2/1999 | F16C 33/10 |
| EP | 2520835 | 11/2012 | F16J 15/34 |
| EP | 2626604 | 8/2013 | F16J 15/34 |
| EP | 2977655 | 1/2016 | F16J 15/34 |
| EP | 3091258 | 11/2016 | F16J 15/34 |
| EP | 3299686 | 3/2018 | F16J 15/34 |
| EP | 3514414 | 7/2019 | F16J 15/34 |
| EP | 3922872 | 12/2021 | F16J 15/34 |
| EP | 3926187 | 12/2021 | F16C 17/04 |
| EP | 3926188 | 12/2021 | F16C 17/04 |
| EP | 3943765 | 1/2022 | F16C 17/04 |
| FR | 1450389 | 6/1966 | |
| GB | 1509482 | 5/1978 | F16C 33/10 |
| JP | 36-6305 | 5/1961 | |
| JP | S49-33614 | 9/1974 | F16J 15/34 |
| JP | S54-77305 | 6/1979 | B06B 9/10 |
| JP | S55-177549 | 12/1980 | F16J 15/16 |
| JP | S57-146955 | 9/1982 | F16J 15/34 |
| JP | 58-109771 | 6/1983 | F16J 15/34 |
| JP | 58-137667 | 8/1983 | F16J 15/40 |
| JP | S59-58252 | 4/1984 | F16J 15/34 |
| JP | S59131567 | 7/1984 | F16C 33/12 |
| JP | S60-107461 | 7/1985 | B63H 23/36 |
| JP | S6182177 | 5/1986 | F16J 15/34 |
| JP | S62-37572 | 2/1987 | F16J 51/34 |
| JP | S63-033027 | 3/1988 | F16C 33/46 |
| JP | S6376959 | 4/1988 | C01B 31/02 |
| JP | S63163025 | 7/1988 | C09K 3/14 |
| JP | S63-190975 | 8/1988 | F16J 15/34 |
| JP | H01133572 | 9/1989 | F16J 15/34 |
| JP | 2-236067 | 9/1990 | F16J 15/34 |
| JP | 3-14371 | 2/1991 | F16J 15/34 |
| JP | 3-35372 | 4/1991 | F16J 15/34 |
| JP | 3-41267 | 4/1991 | F16J 15/34 |
| JP | 3-41268 | 4/1991 | F16J 15/34 |
| JP | H0473 | 1/1992 | F16J 15/34 |
| JP | H04145267 | 5/1992 | F16J 15/34 |
| JP | H0496671 | 8/1992 | F16J 15/34 |
| JP | H0590048 | 12/1993 | F16J 15/34 |
| JP | H05322050 | 12/1993 | F16J 15/34 |
| JP | H723271 | 3/1995 | C04B 41/87 |
| JP | H0755016 | 3/1995 | F16J 15/34 |
| JP | H0889489 | 4/1996 | A61B 5/05 |
| JP | H09503276 | 3/1997 | F16J 15/34 |
| JP | H09329247 | 12/1997 | F16J 15/34 |
| JP | H1038093 | 2/1998 | F16J 15/34 |
| JP | H10281299 | 10/1998 | F16J 15/34 |
| JP | 2000179543 | 6/2000 | F16C 17/10 |
| JP | 2001295833 | 10/2001 | F16C 17/04 |
| JP | 2001317638 | 11/2001 | F16J 15/34 |
| JP | 2003161322 | 6/2003 | F16C 33/10 |
| JP | 2003343741 | 12/2003 | F16J 15/34 |
| JP | 2004003578 | 1/2004 | F16J 15/34 |
| JP | 2004225725 | 8/2004 | C10M 103/02 |
| JP | 2005188651 | 7/2005 | F16J 15/34 |
| JP | 2005321002 | 11/2005 | F16J 15/34 |
| JP | 200558051 | 12/2005 | F16C 33/74 |
| JP | 20069828 | 1/2006 | F16C 17/02 |
| JP | 2006022834 | 1/2006 | F16J 15/34 |
| JP | 200677899 | 3/2006 | F16J 15/34 |
| JP | 2007162045 | 6/2007 | C23C 14/06 |
| JP | 2008128220 | 6/2008 | F04B 39/00 |
| JP | 2008144864 | 6/2008 | F16C 33/10 |
| JP | 2009091661 | 4/2009 | B22F 7/00 |
| JP | 2009250378 | 10/2009 | F16J 15/34 |
| JP | 2010133496 | 6/2010 | F16J 15/34 |
| JP | 2010216587 | 9/2010 | F16J 15/34 |
| JP | 201158517 | 3/2011 | F16J 18/34 |
| JP | 2011185292 | 9/2011 | F16J 15/34 |
| JP | 2011196429 | 10/2011 | F16J 15/34 |
| JP | 20122295 | 1/2012 | F16J 15/34 |
| JP | 5271858 | 5/2013 | F16J 15/34 |
| JP | WO2014042045 | 3/2014 | F16J 15/34 |
| JP | 2014169787 | 9/2014 | C08F 292/00 |
| JP | 5905699 | 4/2016 | F16C 17/02 |
| JP | 201680090 | 5/2016 | F16J 15/34 |
| JP | 2017141961 | 8/2017 | F16J 15/34 |
| JP | 6444492 | 12/2018 | F16J 15/34 |
| JP | 201913446 | 1/2019 | A47J 27/00 |
| JP | 201915309 | 1/2019 | F16J 15/34 |
| JP | 201915401 | 1/2019 | F16J 15/34 |
| JP | 2019190644 | 10/2019 | F04D 29/04 |
| JP | 2020125838 | 8/2020 | F16C 17/02 |
| JP | 2020173020 | 10/2020 | F16C 33/74 |
| WO | WO9506832 | 3/1995 | F16J 15/34 |
| WO | WO2012046749 | 4/2012 | F16J 15/34 |
| WO | WO2014024742 | 2/2014 | F16J 15/34 |
| WO | WO2014050920 | 4/2014 | F16J 15/34 |
| WO | WO2014103630 | 7/2014 | F16J 15/34 |
| WO | WO2014103631 | 7/2014 | F16J 15/34 |
| WO | WO2014112455 | 7/2014 | F16J 15/34 |
| WO | WO-2014147221 A2 * | 9/2014 | C10M 25/26 |
| WO | WO2014148316 | 9/2014 | F16J 15/34 |
| WO | WO2014174725 | 10/2014 | F16J 15/34 |
| WO | WO2016009408 | 1/2016 | F16J 15/34 |
| WO | WO2016035860 | 3/2016 | F16J 15/34 |
| WO | WO2016167262 | 10/2016 | F16J 15/34 |
| WO | WO2016186019 | 11/2016 | F16J 15/34 |
| WO | WO2016203878 | 12/2016 | F16J 15/34 |
| WO | WO2017002774 | 1/2017 | F16J 15/34 |
| WO | WO2018034197 | 2/2018 | F16J 15/34 |
| WO | WO2018051867 | 3/2018 | F16J 15/34 |
| WO | WO2018105505 | 6/2018 | F16J 15/34 |
| WO | WO2018139231 | 8/2018 | F16J 15/34 |
| WO | WO2018139232 | 8/2018 | F16C 33/10 |
| WO | WO2020130087 | 6/2020 | F16J 15/34 |
| WO | WO2020166588 | 8/2020 | F16C 17/04 |
| WO | WO2021020074 | 2/2021 | F16J 15/34 |

OTHER PUBLICATIONS

U.S. Appl. No. 18/284,145, filed Sep. 26, 2023.

Definition of groove by Merriam Webster.

PCT International Search Report, Written Opinion and International Preliminary Report on Patentability issued in PCT/JP2022/012343, dated May 31, 2023 with English Translation, 21 pages.

(56) References Cited

OTHER PUBLICATIONS

PCT International Search Report, Written Opinion and International Preliminary Report on Patentability issued in PCT/JP2022/012342, dated May 31, 2023 with English Translation, 20 pages.

* cited by examiner

SLIDING COMPONENT

TECHNICAL FIELD

The present invention relates to a sliding component that performs relative sliding and is used for, for example, a shaft sealing device shaft-sealing a rotary shaft of a rotating machine in the automotive seal field, the general industrial machinery seal field, or another seal field or a bearing of a machine in the automotive bearing field, the general industrial machinery bearing field, or another bearing field.

BACKGROUND ART

A sliding component has a sliding surface that slides relative to a mating sliding surface and is used as a component of a bearing supporting, for example, a rotating or reciprocating shaft or a shaft sealing device for sealed fluid leakage prevention. A mechanical seal as an example of the shaft sealing device for sealed fluid leakage prevention includes a pair of annular sliding components rotating relative to each other and having sliding surfaces sliding with each other. For example, the sliding component that is disclosed in Patent Citation 1 provides a low-friction effect using the self-lubricating properties of carbon by being formed of carbon, which is a soft material, and yet the sliding surface of the sliding component made of carbon is likely to be scraped in the case of inter-sliding surface foreign matter intrusion, which is problematic in terms of foreign matter resistance.

CITATION LIST

Patent Literature

Patent Citation 1: JP 2011-58517 A (Page 6, FIG. 1)
Patent Citation 2: JP 2004-225725 A (Page 6, FIG. 2)

SUMMARY OF INVENTION

Technical Problem

Although foreign matter resistance can be enhanced by forming a sliding component with SiC as a hard material (for example, Patent Citation 2), in a case where a mechanical seal is used in, for example, a non-lubricated (that is, dry) environment in which no liquid is interposed between sliding surfaces, galling may occur on the sliding surfaces depending on the conditions of use as the coefficient of friction of SiC in the atmosphere is high. In addition, in Patent Citation 2, a sliding component has a sliding surface coated with a diamond-like carbon coating (hereinafter, referred to as a DLC coating in some cases) and, in the case of use in a non-lubricated environment as an example, galling may occur on a mating sliding surface depending on the conditions of use as the DLC coating is high in hardness. In order to obtain the low-friction effect of the DLC coating, complicated condition setting such as changing, for example, the hydrogen content of the DLC coating in accordance with the conditions of use is required, which results in poor versatility.

The present invention has been made in view of such problems, and an object of the present invention is to provide a sliding component capable of obtaining a stable low-friction effect in a wide range of conditions of use.

Solution to Problem

In order to solve the foregoing problem, a sliding component according to the present invention is a sliding component having a sliding surface performing relative sliding, in which a base material of the sliding component is directly coated with a thin film mainly made of graphite, the sliding surface is formed by the thin film, and the thin film contains a filler with a dimension equal to or less than a thickness of the thin film. According to the foregoing feature of the present invention, the base material of the sliding component is coated with the graphite-centered thin film containing the filler. As a result, friction with a mating sliding surface shears the graphite-centered thin film constituting the sliding surface between the graphite layers bonded by the van der Waals force. In addition, a part of the thin film remains in a fine recess of the surface of the base material to result in smoothing of the sliding surface, and the self-lubricating properties of graphite can be exhibited with respect to the mating sliding surface. Therefore, a stable low-friction effect can be obtained in a wide range of conditions of use such as fluid lubrication areas, boundary lubrication areas, and non-lubricated environments. In addition, a filler function is added to the sliding surface, the filler is unlikely to fall off even with the thin film small in film thickness, filler protrusion from the sliding surface can be suppressed as well, and thus the mating sliding surface is hardly damaged by friction.

It may be preferable that the thin film contains a high-hardness filler harder than the graphite constituting the thin film. According to this preferable configuration, the wear resistance and foreign matter resistance of the sliding surface can be enhanced by the graphite-centered thin film containing the high-hardness filler.

It may be preferable that the high-hardness filler is lower in hardness than a mating sliding surface with which the sliding surface slides relatively. According to this preferable configuration, the high-hardness filler is softer than the mating sliding surface, and thus the mating sliding surface is unlikely to be damaged by friction.

It may be preferable that the thin film contains a low-friction filler lower in coefficient of friction than the graphite constituting the thin film. According to this preferable configuration, the graphite-centered thin film is capable of enhancing the lubricity of the sliding surface by containing the low-friction filler.

DESCRIPTION OF EMBODIMENTS

A mode for implementing the sliding component according to the present invention will be described below based on an embodiment.

Embodiment

The sliding component according to the embodiment of the present invention will be described with reference to FIGS. 1 to 5. It should be noted that a mode in which the sliding component is a mechanical seal will be described as an example in the present embodiment. In addition, in the following description, the inner diameter side of the sliding component constituting the mechanical seal is a low-pressure fluid side as a leak side and the outer diameter side is a high-pressure fluid side (sealed gas side) as a sealed fluid side.

Figure 1:
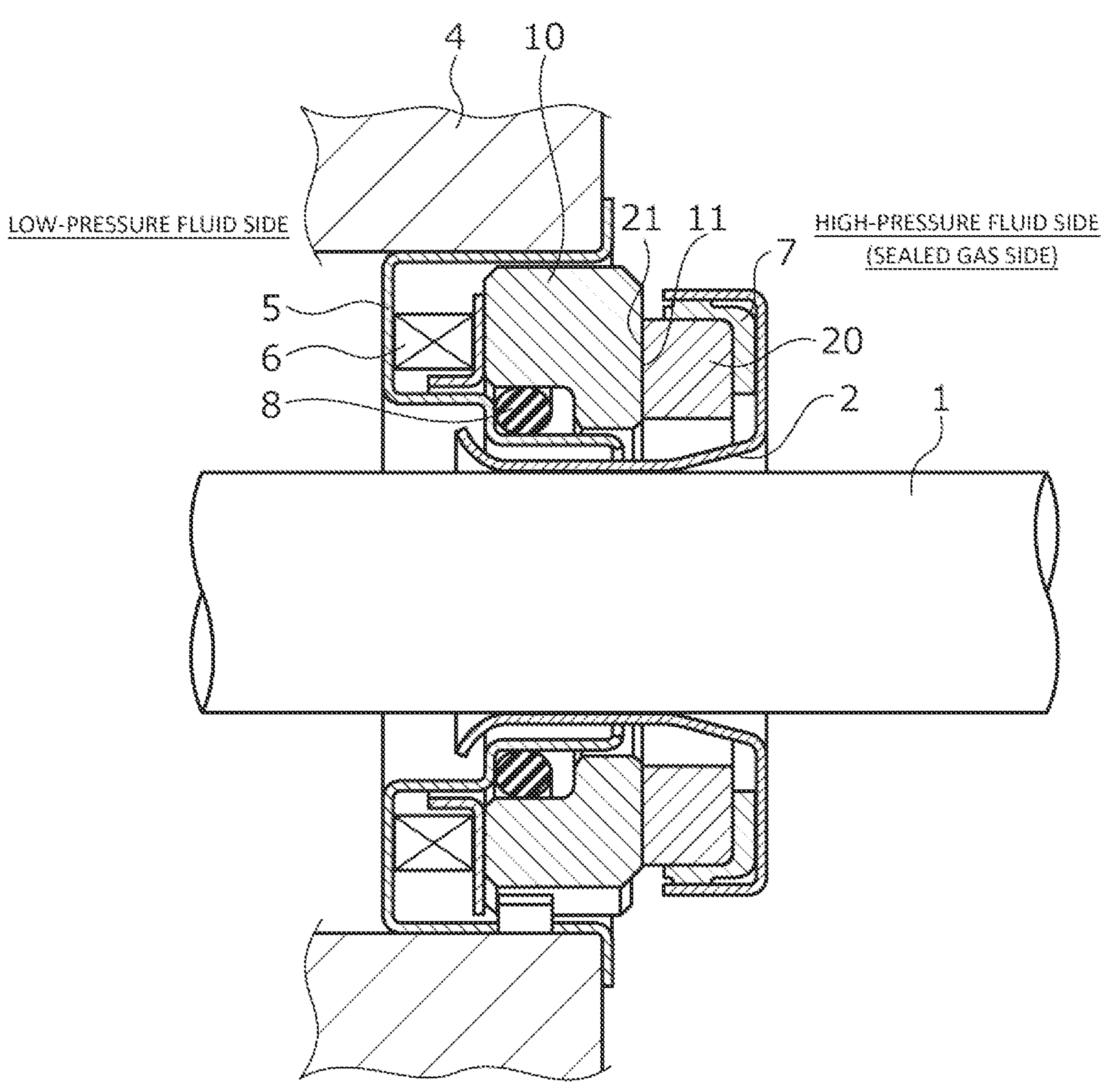
FIG. 1 is a longitudinal cross-sectional view illustrating an example of a mechanical seal including a sliding component according to an embodiment of the present invention.

The mechanical seal for general industrial machinery illustrated in FIG. 1 is an inside mechanical seal that seals a sealed gas to leak from the outer diameter side toward the inner diameter side of a sliding surface in a non-lubricated (that is, dry) environment in which no liquid is interposed between the sliding surfaces.

The mechanical seal mainly includes a rotating seal ring 20 as a sliding component and a stationary seal ring 10 as a sliding component. The rotating seal ring 20 has an annular shape and is provided on a rotary shaft 1 in a state of being rotatable together with the rotary shaft 1 via a sleeve 2. The stationary seal ring 10 has an annular shape and is provided on a seal cover 5 fixed to a housing 4 of an attachment target device in a non-rotating state and a state of being movable in the axial direction. A sliding surface 11 of the stationary seal ring 10 and a sliding surface 21 of the rotating seal ring 20 slide closely with each other by a spring 6 urging the stationary seal ring 10 in the axial direction. In addition, a gasket 7 seals between the rotating seal ring 20 and the sleeve 2, and an O-ring 8 seals between the stationary seal ring 10 and the seal cover 5.

The stationary seal ring 10 and the rotating seal ring 20 in the present embodiment are formed of silicon carbide (abbreviated to SiC). It should be noted that the stationary seal ring 10 and the rotating seal ring 20 may be made of different materials without being limited to being made of the same material.

Figure 2:
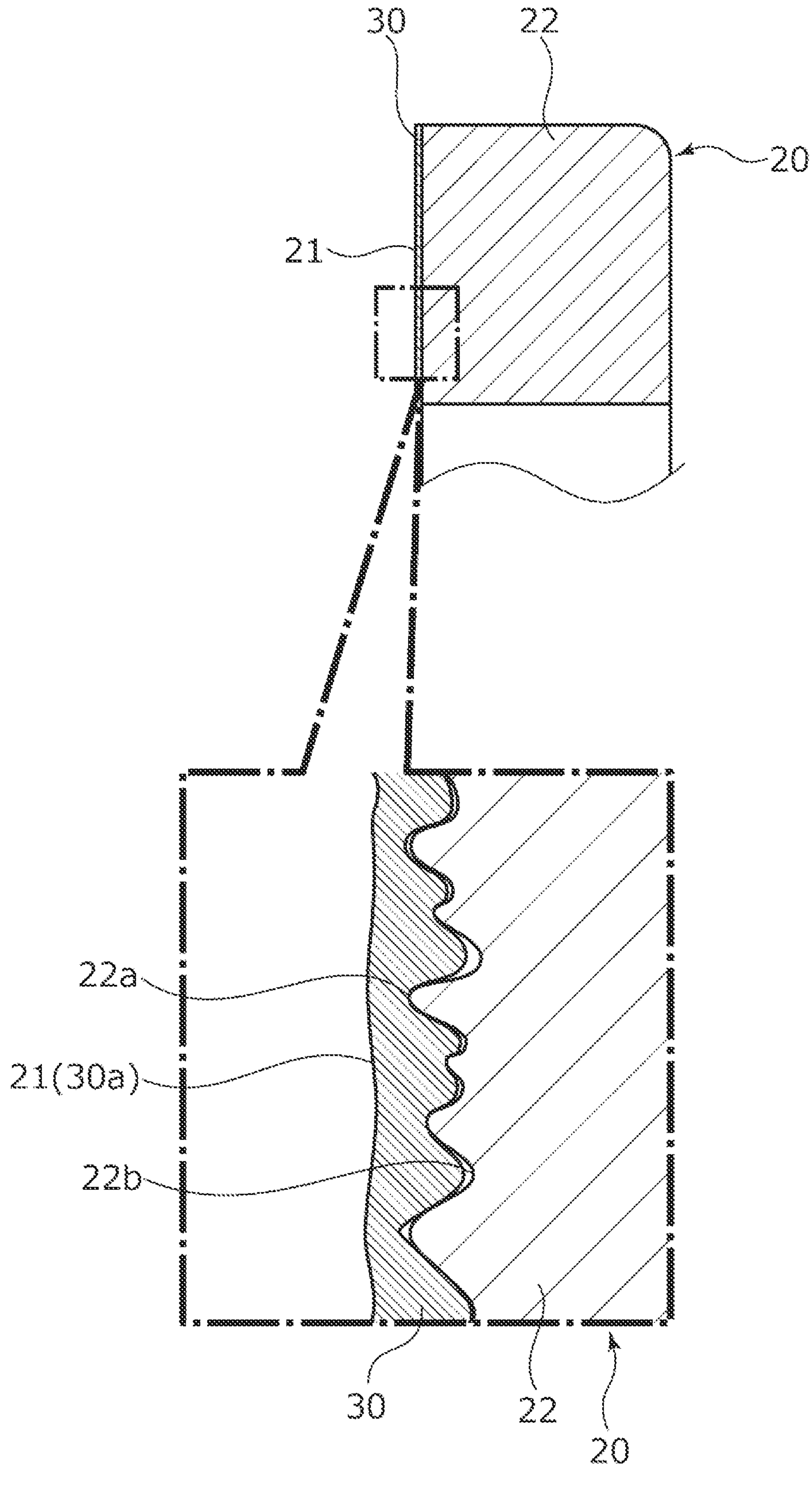
FIG. 2 is an enlarged cross-sectional view illustrating a sliding surface of a rotating seal ring that is yet to be used with a thin film in the embodiment formed.

As illustrated in FIG. 2, the rotating seal ring 20 is configured by directly coating a SiC base material 22 as a base material with a thin film 30. In other words, a surface 30*a* of the thin film 30 constitutes the substantial sliding surface 21 of the rotating seal ring 20. It should be noted that in the present embodiment, no thin film is formed on the sliding surface 11 of the stationary seal ring 10 as a mating sliding surface (see FIG. 4).

It should be noted that as for the sliding surface 21 of the present embodiment, the thickness of the thin film 30 is thicker than the roughness of the SiC base material 22 and the entire surface of one end surface portion 22*a* of the SiC base material 22 in the axial direction is coated with the thin film 30 as will be described later. However, the present invention is not limited thereto. For example, as for the sliding surface 21, a part of the end surface portion 22*a* of the SiC base material 22, such as the mountain top portion of the surface, may be exposed without being coated with the thin film 30 by making the thin film 30 thin.

In addition, by the SiC base material 22 being directly coated with the thin film 30, as compared with a case that entails an intermediate layer or the like, the labor of intermediate layer formation is unnecessary and there are no constraints in terms of conditions of use for matching an intermediate layer.

It should be noted that "thin" of the thin film means that the thin film is thinner than the base material.

In addition, in the present embodiment, the thin film 30 has a layered structure, the parent material of the layered structure is a skeleton structure of carbon atoms with graphite as a main component, and the film contains high-hardness fillers 40 and low-friction fillers 41 as fillers.

It should be noted that graphite is mainly configured from carbon atoms, is a type of carbon material, and is a substance that mainly has a hexagonal crystal structure and is analyzed by Raman spectroscopic analysis or the like.

Specifically, the thin film 30 of the present embodiment is a graphite-centered thin film, that is, a thin film with a composition that conspicuously exhibits the characteristics of the graphite component of the skeleton structure of the carbon atoms on the surface. In the thin film 30, the carbon atoms that mainly constitute graphite constitute a sheet-shaped crystal structure disposed in a hexagonal system by covalent bonding, and the thin sheet-shaped crystal structure is bonded in layers by the van der Waals force, which results in graphite layer formation. It should be noted that some of the carbon atoms in the skeleton structure may form a region configured from non-graphitized carbon.

As for the thin film 30, a polyamic acid varnish as a precursor solution obtained by dissolving a polyimide resin as a thermosetting resin in an organic solvent is directly applied using an applicator such as a bar coater and a spin coater so as to coat the one end surface portion 22*a* in the axial direction of the SiC base material 22 constituting the rotating seal ring 20, and imidization is performed by drying and curing treatment. Then, the graphitized skeleton is formed by performing heating and curing at a temperature of 1200° C. or higher in an inert atmosphere and further performing firing. In other words, the skeleton structure of carbon atoms in the thin film 30 is polyamic acid-derived.

It should be noted that by the thin film 30 being formed with a thickness within a predetermined range, it is possible to prevent the film from tearing and the thermosetting resin can be graphitized by firing at a relatively low temperature. Further, it should be noted that the thin film 30 before initial use may be formed so as to be 1 μm to 100 μm in thickness. At a film thickness that is less than the above value, peeling occurs between the film and the SiC base material 22. At a film thickness that exceeds the above value, cracking occurs during the formation of the film. In addition, regarding the film thickness of the thin film 30, it is preferable to set an optimal value in accordance with the particle diameter of the filler or additive dispersed in the film.

In addition, the end surface portion 22*a* of the SiC base material 22 coated with the thin film 30 has an arithmetic mean roughness Ra of 0.1 μm or more on the surface thereof, and the thin film 30 is formed in a state where a part of the thin film 30 is in a fine recess 22*b* of the end surface portion 22*a* of the SiC base material 22.

In addition, in measuring the hardness of the thin film 30 and the hardness of a SiC base material 12, a test was performed using a nanoindenter and it was confirmed that the SiC base material 12 was harder in value than the thin film 30.

As described above, the thin film 30 of the present embodiment is formed with a graphite region-centered surface by firing a polyimide resin as a thermosetting resin at a temperature of 1200° C. or higher. It should be noted that the film composition of the thin film 30 can be determined by analyzing the film composition by, for example, XRD, Raman spectroscopic analysis, or thermal analysis.

In addition, the thin film 30 is preferably formed by firing a polyimide resin as a thermosetting resin at a temperature of 1200° C. or higher and lower than 2000° C.

Figure 3:
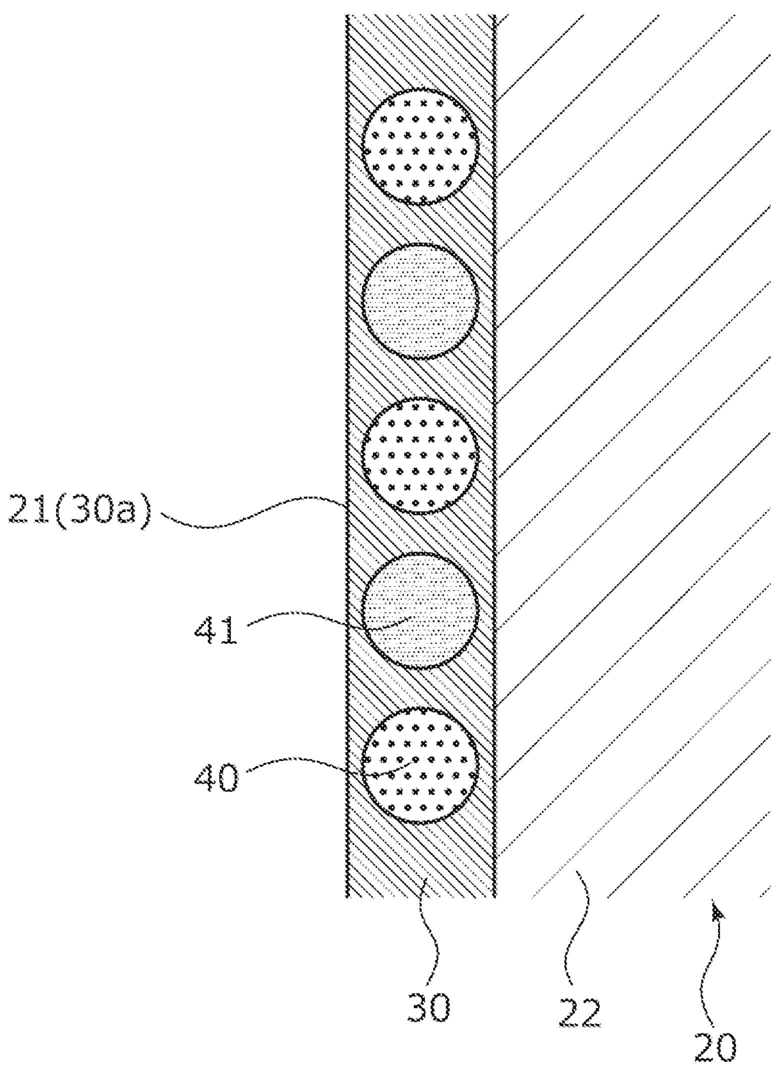
FIG. 3 is a schematic cross-sectional view illustrating a state where fillers are dispersed in the thin film in the embodiment.
Figure 4:
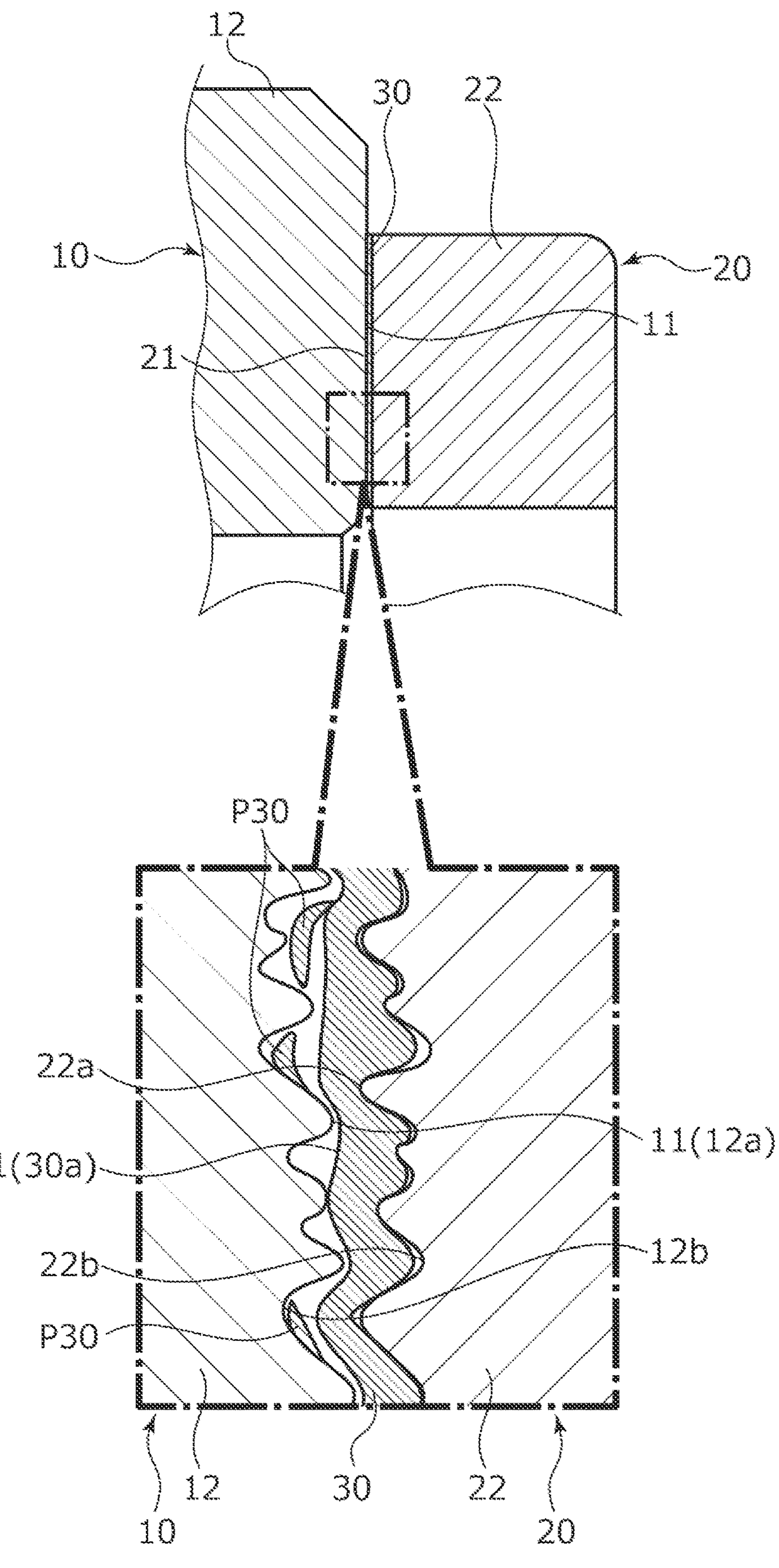
FIG. 4 is an enlarged cross-sectional view illustrating a state where a shear mass of graphite has been generated as a result of sliding between the sliding surface of the rotating seal ring on which the thin film in the embodiment is formed and a sliding surface of a stationary seal ring.
Figure 5:
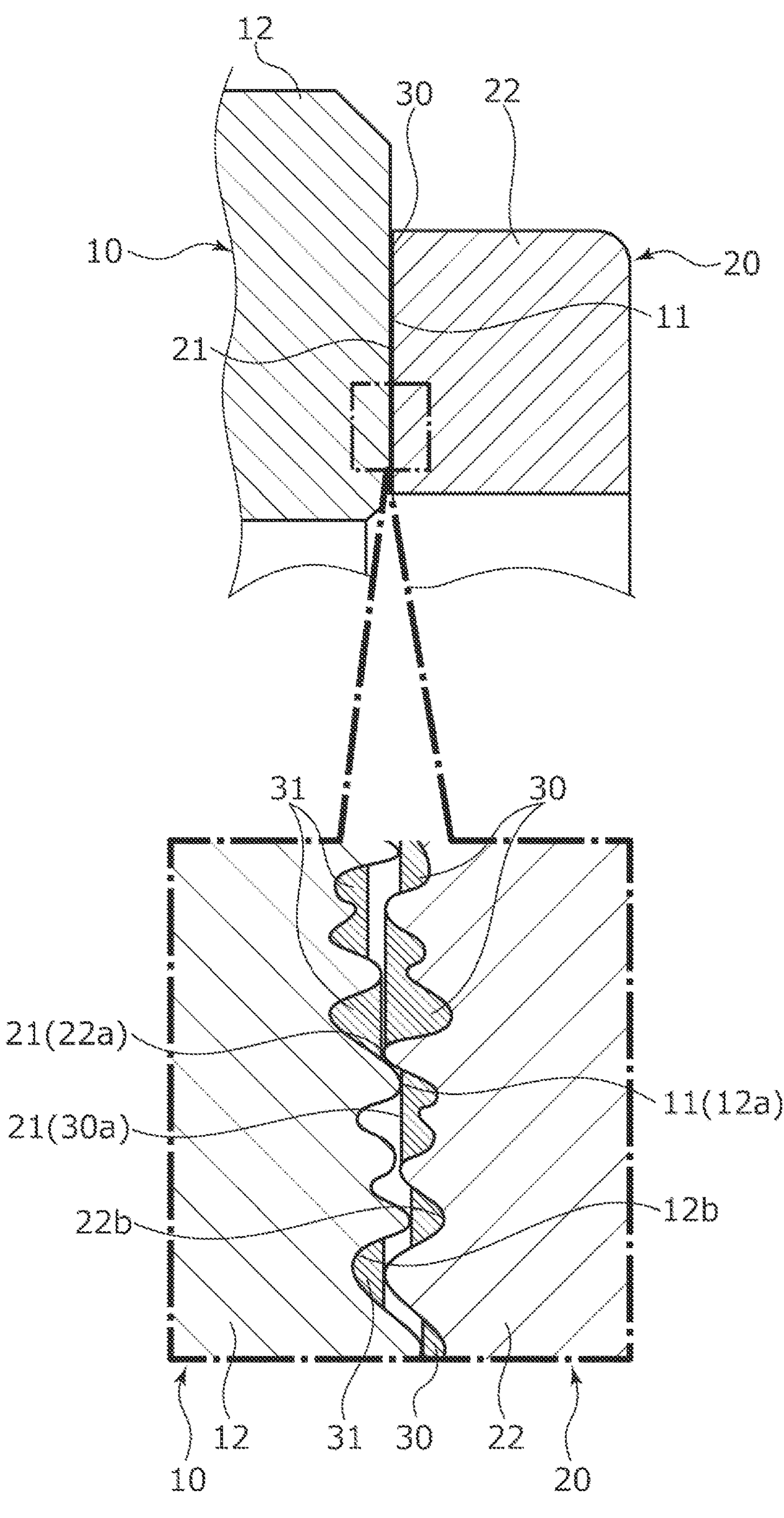
FIG. 5 is an enlarged cross-sectional view illustrating a state after the sliding between the sliding surface of the rotating seal ring on which the thin film in the embodiment is formed and the sliding surface of the stationary seal ring.

As illustrated in FIG. 3, in the thin film 30, the granular high-hardness fillers 40 and low-friction fillers 41 with dimensions equal to or less than the film thickness of the thin film 30 are dispersed substantially uniformly. It should be noted that in FIG. 3, for convenience of description, the high-hardness fillers 40 and the low-friction fillers 41 are illustrated with the same particle diameter. In addition, the fillers may be nanofillers.

In the present embodiment, coke harder than the graphite constituting the thin film 30 and softer than the SiC base material 12 constituting the mating sliding surface was used as the high-hardness filler 40. It should be noted that not only coke but also a filler such as carbon black (C.B.), carbon fiber (C.F.), activated carbon, and graphite powder may be used as the high-hardness filler 40.

In addition, in measuring the hardness of the high-hardness filler 40, a test was performed using a nanoindenter and it was confirmed that the high-hardness filler 40 was harder in value than the graphite constituting the thin film 30 and the high-hardness filler 40 was softer in value than the SiC base material 12.

In addition, the thin film 30 is preferably adjusted such that the content of the high-hardness filler 40 in the film is 1 to 50 wt %.

In addition, in the present embodiment, kaolin clay lower in coefficient of friction than the graphite constituting the thin film 30 was used as the low-friction filler 41.

In measuring the coefficients of friction of the thin film 30 and the low-friction filler 41, a test for frictional force measurement was performed using an atomic force microscope (AFM), and it was confirmed that the coefficient of friction of the low-friction filler 41 was lower in value than the coefficient of friction of the graphite constituting the thin film 30.

As for the thin film 30 of the present embodiment, the wear resistance of the graphite-centered thin film 30 can be enhanced by adding the high-hardness filler 40 as a main filler and the coefficient of friction of the surface of the thin film 30 can be reduced by adding the low-friction filler 41 by a small amount. It should be noted that the coefficient of friction in a dry environment in particular can be reduced by using kaolin clay as the low-friction filler 41.

In addition, it is preferable that the thin film 30 has a total filler content of 75 wt % or less in order to exhibit a low-friction effect attributable to the self-lubricating properties of graphite.

In addition, as for the thin film 30, the type, number, and content ratio of the filler contained in the film may be freely changed in accordance with properties required for the sliding surface 21. For example, by adding cerium oxide as a filler in addition to the high-hardness filler 40 and the low-friction filler 41 described above, silicate deposits attributable to a long life coolant (LLC) can be removed. In addition, electrical properties can be given to the thin film by adding carbon nanotube (CNT) or natural graphite as a filler.

It should be noted that a spectroscopic analyzer manufactured by Nanophoton Corporation was used to analyze the degree of graphitization of the surface of the thin film 30 and measurement was performed at a center wavenumber of 2082.24 $cm^{-1}$, an excitation wavelength of 532.36 nm, and a laser intensity of 0.8 mW. IG is the intensity of the G peak at a center wavenumber of 1574 to 1576 $cm^{-1}$. ID is the intensity of the D peak at a center wavenumber of 1344 to 1348 $cm^{-1}$. Measurement is performed at a plurality of points in a specific sample region, intensity ratio ID/IG is calculated from the G and D peak intensities of the averaged spectrum, and the value being 1 or less indicates graphite in the present invention.

A ring-on-ring friction/wear test under the following conditions was conducted regarding the rotating seal ring 20 formed with the thin film 30. The result of the test will be described below. In addition, the stationary seal ring 10 is thin film-less as described above and at least the sliding surface 11 is formed of SiC.

Load=10 N

Surface pressure of sliding surface of stationary seal ring=0.25 MPa

Rotation speed of rotating seal ring=74 rpm

PV factor=0.008 MPa·m/sec

Test time=up to sliding distance of 1000 m

Sealed fluid=atmosphere

Table 1 shows the result of formation of the thin film 30 of the rotating seal ring 20 (Samples F to M) and the test result of the ring-on-ring friction/wear test in the present embodiment. It should be noted that regarding the ring-on-ring friction/wear test, usability was determined based on whether or not seizure of the sliding surface occurred in a non-lubricated environment. Further, it should be noted that the presence or absence of peeling of the thin film 30 off the sliding surface 21 of the rotating seal ring 20 and the presence or absence of cracking were confirmed after the ring-on-ring friction/wear test. Regarding the confirmation of the presence or absence of the peeling of the thin film, it was determined that the peeling off the sliding surface 21 of the rotating seal ring 20 occurred with deposits removed by air blowing on the sliding surface 21 of the rotating seal ring 20 and the remaining thin film 30 in the fine recess 22*b* of the end surface portion 22*a* having an intra-contact range area ratio of 80% or less at a magnification of optical microscope 5*x*. Regarding the confirmation of the presence or absence of the thin film cracking, the presence or absence of the cracking was confirmed with deposits removed by air blowing on the sliding surface 21 of the rotating seal ring 20.

TABLE 1

| Sample | Film thickness (μm) | Usability | Peeling | Cracking |
|---|---|---|---|---|
| F | 1 | ○ | Absent | Absent |
| G | 10 | ○ | Absent | Absent |
| H | 20 | ○ | Absent | Absent |
| I | 50 | ○ | Absent | Absent |
| K | 100 | ○ | Absent | Absent |
| L | 0.5 | — | Present | Absent |
| M | 120 | — | Absent | Present |

It was determined that the thickness was 1 μm to 100 μm in the case of the thin film 30 of the rotating seal ring 20 where the sliding surface was seizure-free and the thin film 30 neither peeled off the sliding surface 21 of the rotating seal ring 20 nor cracked in a non-lubricated environment (Samples F, G, H, I, and K).

The rotating seal ring 20 formed with the thin film 30 in the present embodiment was prepared with the content (wt %) of the high-hardness filler 40 in the film changed, and a ring-on-ring friction/wear test was conducted under the following conditions. The result of the test will be described below. It should be noted that the thin film 30 of the rotating seal ring 20 is formed with the thickness unified to 20 μm. In addition, the thin film 30 is formed with the content of the low-friction filler 41 in the film unified to 5 wt %. In addition, the stationary seal ring 10 is thin film-less as described above and at least the sliding surface 11 is formed of SiC.

Load=10 N

Surface pressure of sliding surface of stationary seal ring=0.25 MPa

Rotation speed of rotating seal ring=74 rpm PV factor=0.008 MPa·m/sec

Test time=up to sliding distance of 1000 m

Sealed fluid=atmosphere

Table 2 shows the test result of the ring-on-ring friction/wear test of the rotating seal ring 20 in the present embodiment (Samples N to S). It should be noted that regarding the ring-on-ring friction/wear test, usability was determined based on whether or not seizure of the sliding surface occurred in a non-lubricated environment. Further, it should be noted that the presence or absence of cracking in the thin film 30 on the sliding surface 21 of the rotating seal ring 20 was confirmed, as in Table 1, after the ring-on-ring friction/wear test.

TABLE 2

| Sample | High-hardness filler (wt %) | Usability | Cracking |
|---|---|---|---|
| N | 5 | X | Present |
| O | 10 | ○ | Absent |
| P | 15 | ○ | Absent |
| Q | 20 | ○ | Absent |
| R | 25 | ○ | Absent |
| S | 30 | X | Absent |

It was determined that the content of the high-hardness filler 40 was 10 wt % or more and the total content of the high-hardness filler 40 and the low-friction filler 41 was 30 wt % or less in the case of the thin film 30 of the rotating seal ring 20 that was sliding surface seizure-free and cracking-free in a non-lubricated environment (Samples O, P, Q, and R).

It should be noted that in a case where the stationary seal ring 10 as a mating side with respect to the sliding surface 21 that lacks the thin film 30 is formed of carbon, which is a soft material, foreign matter intrusion between the sliding surfaces 11 and 21 results in foreign matter biting into the sliding surface 11 of the stationary seal ring 10 formed of the soft carbon, and then the sliding surface 11 is scraped to result in surface roughness, the smoothness of the sliding surface is lost, and the coefficient of friction is adversely affected. In this manner, a sliding surface of a sliding component formed of carbon is problematic in terms of foreign matter resistance. On the other hand, in the present embodiment, the rotating seal ring 20 is configured by coating the hard SiC base material 22 with the thin film 30 and the mating stationary seal ring 10 is also formed of SiC, which is a hard material, and thus the graphite region of the thin film 30 is preferentially scraped with respect to foreign matter intrusion between the sliding surfaces 11 and 21 and surface roughness of the SiC base materials 12 and 22, which adversely affects the coefficient of friction of the sliding surface, is unlikely to occur.

As described above, the SiC base material 22 of the rotating seal ring 20 according to the present invention is directly coated with the graphite-centered thin film 30 containing the high-hardness filler 40 and the low-friction filler 41. As a result, friction with the sliding surface 11 of the stationary seal ring 10 shears the graphite-centered thin film 30 constituting the sliding surface 21 between the graphite layers bonded by a weak van der Waals force (see the enlarged part of FIG. 4). In addition, the pressure contact force between the sliding surfaces 11 and 21 causes an inward push in the axial direction and a part of the thin film 30 enters and remains in the fine recess **22*b* of the end surface portion 22*a* of the SiC base material 22 to result in smoothing of the sliding surface 21 (see the enlarged part of FIG. 5). As a result, the remaining thin film 30 in the fine recess 22*b* is capable of exhibiting the self-lubricating properties of graphite with respect to the sliding surface 11 of the stationary seal ring 10**, and thus a stable low-friction effect can be obtained in a wide range of conditions of use such as fluid lubrication areas, boundary lubrication areas, and non-lubricated environments.

In addition, the functions of the high-hardness filler 40 and the low-friction filler 41 with dimensions equal to or less than the film thickness of the thin film 30 are added to the sliding surface 21 of the rotating seal ring 20 coated with the thin film 30, the high-hardness filler 40 and the low-friction filler 41 are unlikely to fall off even with the thin film 30 small in film thickness, protrusion from the sliding surface 21 of the high-hardness filler 40 in particular can be suppressed as well, and thus the sliding surface 11 of the stationary seal ring 10 is unlikely to be damaged by friction. It should be noted that the thin film 30 is highly capable of retaining particles such as fillers. In a dry environment as well, it is possible to prevent a carbon-based filler in particular from falling off.

In addition, the thin film 30 contains the high-hardness filler 40 harder than the graphite constituting the thin film 30, and thus the wear resistance and foreign matter resistance of the sliding surface 21 configured by the graphite-centered thin film 30 can be enhanced.

Further, the thin film 30 is capable of forming roughness on the sliding surface 21 by not the high-hardness filler 40 but the graphite region preferentially wearing to form unevenness on the sliding surface 21. As a result, while the protrusion formed on the sliding surface 21 bearing a load, during fluid lubrication in particular, the lubrication is promoted by the fluid entering the recess, and noise attributable to sliding can be prevented.

In addition, lubricity can be improved by a shear mass P30 of graphite derived from the thin film 30 being interposed in the fluid.

In addition, the high-hardness filler 40 is softer than the sliding surface 11 of the stationary seal ring 10, and thus the mating sliding surface 11 is unlikely to be damaged by friction.

In addition, the thin film 30 is capable of enhancing the lubricity of the sliding surface 21 by containing the low-friction filler 41 lower in coefficient of friction than the graphite constituting the thin film 30.

Further, the thin film 30 is formed only on the sliding surface 21 of the rotating seal ring 20. As a result, the shear mass P30 of graphite derived from the thin film 30 and generated between the sliding surfaces 11 and 21 (see the enlarged part of FIG. 4) is axially pushed in by the pressure contact force between the sliding surfaces 11 and 21, enters and transfers into a fine recess **12*b* of an end surface portion 12*a* of the SiC base material 12 constituting the sliding surface 11 of the stationary seal ring 10, and forms a transfer film 31, which results in smoothing of the sliding surface 11 of the stationary seal ring 10 as well (see the enlarged part of FIG. 5). As a result, between the sliding surfaces 11 and 21**, the ratio of the SiC-graphite or graphite-graphite sliding part increases, and thus a more satisfactory low-friction effect can be obtained.

In addition, the thin film 30 is formed by directly applying a polyamic acid varnish as a precursor solution obtained by dissolving a polyimide resin as a thermosetting resin in an organic solvent to the end surface portion 22*a* of the SiC base material 22 and performing firing, and thus the thin film 30 is highly adhesive with respect to the SiC base material 22 by entering the fine recess 22*b* of the end surface portion 22*a* of the SiC base material 22. It should be noted that suitable shrinkage occurs in the surface direction and the thickness direction and adhesion can be improved by application and film formation being performed with the polyamic acid varnish as a precursor solution of polyimide resin excellent in film-forming properties adjusted to any viscosity. Therefore, the thin film 30 is not limited in terms of film formation area.

In addition, since the SiC base material 22 is directly coated with the thin film 30, frictional heat resulting from relative sliding with the mating sliding surface 11 is directly transferred from the thin film 30 to the SiC base material 22, and thus a rise in the temperature of the sliding surface 21 can be suppressed.

In addition, although graphite is usually prepared at an ultra-high temperature of approximately 3000° C., the thin film 30 of the present invention can be prepared by thin polyamic acid varnish application and firing at a relatively low temperature of 1200° C. or higher and lower than 2000° C., and thus peeling, tearing, or the like of the thin film 30 attributable to thermal shrinkage is unlikely to occur, excellent workability can be achieved, and graphite-based excellent self-lubricating properties can be exhibited on the sliding surface 21.

In addition, the thin film 30 is as thin as 1 μm to 100 μm and contains the fillers with dimensions equal to or less than the film thickness of the thin film 30. As a result, the gas that is generated in the thin film 30 during firing is capable of escaping with ease and cracking can be prevented.

In addition, the sliding surface 11 of the stationary seal ring 10, that is, the SiC base material 12 is harder than the thin film 30, and thus the thin film 30 is softer than the sliding surface 11 of the stationary seal ring 10 and the sliding surface 11 of the stationary seal ring 10 is unlikely to be damaged by friction. Further, the SiC base material 22 of the rotating seal ring 20 is harder than the thin film 30. As a result, in the case of foreign matter intrusion between the sliding surfaces 11 and 21, smoothing of the sliding surface 21 is promoted by the graphite region of the soft thin film 30 being preferentially sheared, foreign matter resistance can be enhanced by the end surface portion 22*a* of the exposed and hard SiC base material 22 and the high-hardness filler 40, and thus both the self-lubricating properties of graphite and foreign matter resistance can be achieved between the sliding surfaces 11 and 21.

In addition, the base material of the rotating seal ring 20 is formed of SiC, which is ceramics, and the SiC base material 22 is porous. As a result, the end surface portion 22*a* has a large number of fine recesses 22*b* where a part of the thin film 30 enters, roughness occurs more easily than with metal, and thus the thin film 30 is easily fixed on the surface of the base material. Further, as for the end surface portion 22*a* of the SiC base material 22 where the thin film 30 is formed, the arithmetic mean roughness Ra of the surface is 0.1 μm or more, and thus a part of the thin film 30 enters the fine recess 22*b* of the end surface portion 22*a* with greater ease. As a result, even in the event of shearing of the graphite region of the thin film 30 attributable to friction with the sliding surface 11 of the stationary seal ring 10, a part of the thin film 30 is held in the fine recess 22*b* and is unlikely to fall off between the sliding surfaces 11 and 21.

In addition, the entire surface of the end surface portion 22*a* of the SiC base material 22 is coated with the thin film 30. In other words, the base material surface is not exposed. As a result, a part of the thin film 30 enters every fine recess 22*b* in the end surface portion 22*a*, and thus the sliding surface 21 is easily smoothed by the graphite region of the thin film 30 being sheared.

In addition, the thin film 30 has a thickness of 1 μm to 100 μm. As a result, peeling of the thin film 30 off the end surface portion 22*a* of the SiC base material 22 and cracking of the thin film 30 can be prevented, and thus the film 30 can be used as a film for sliding components.

Further, the thickness of the thin film 30 exceeds the arithmetic mean roughness Ra of the surface of the end surface portion 22*a* of the SiC base material 22. In other words, the thickness of the thin film 30 exceeds the unevenness of the surface of the end surface portion 22*a* of the SiC base material 22. As a result, a part of the thin film 30 easily enters the fine recess 22*b* of the SiC base material 22, the graphite region of the thin film 30 is reliably sheared by friction with the sliding surface 11 of the stationary seal ring 10, and thus a part of the thin film 30 easily remains in the fine recess 22*b* and a low-friction effect is exhibited with ease.

In addition, the base material of the rotating seal ring 20 and the sliding surface can be formed of different materials. As a result, while the base material is given the rigidity and high thermal conductivity of ceramics such as SiC, the self-lubricating properties of graphite and the functions of various fillers can be given by the thin film 30 of the sliding surface 21. Further, the cost of the sliding component can be reduced by replacing the base material with an inexpensive material.

In addition, the thin film 30 is graphite-centered and thus is excellent in chemical resistance and oxidation resistance. It should be noted that the oxidation resistance of the thin film 30 is at the same level as artificial graphite for electrodes with high crystallinity and indicates that high crystallinity can be obtained at a relatively low temperature.

Although an embodiment of the present invention has been described above with reference to the drawings, the specific configurations are not limited to the embodiment and any changes or additions within the scope of the present invention are included in the present invention.

For example, although the mechanical seal for general industrial machinery has been described as an example of the sliding component in the above embodiment, the mechanical seal may be replaced with another mechanical seal for an automobile, a water pump, or the like. In addition, the present invention is not limited to the mechanical seal and may be a sliding component other than a mechanical seal, examples of which include a slide bearing. Further, the thin film 30 can be formed on the inner peripheral surface of a bearing as well and thus is also applicable to sliding components constituting radial bearings and so on.

In addition, although the mechanical seal to which the sliding component is applied is used in a non-lubricated environment in the above embodiment, the present invention is not limited thereto and it may be used in a fluid lubrication area or a boundary lubrication area in which a liquid as a sealed fluid is interposed between the sliding surfaces.

In addition, although an example in which the thin film 30 is provided only on the rotating seal ring 20 has been described in the above embodiment, the thin film 30 may be provided only on the stationary seal ring 10 or may be provided on both the rotating seal ring 20 and the stationary seal ring 10.

In addition, although the thin film 30 in the above embodiment is derived from polyamic acid as a precursor solution obtained by dissolving a polyimide resin in an organic solvent, the present invention is not limited thereto and the thin film may be derived from a precursor solution obtained by dissolving, in an organic solvent, one or two or more thermosetting resins selected from phenol resin, melamine resin, urea resin, epoxy resin, unsaturated polyester resin, silicone resin, diallyl phthalate resin, polyimide resin, polyurethane resin, and so on.

In addition, the filler is not limited to being granular and may be, for example, fibrous.

In addition, the thin film 30 may not contain the low-friction filler 41 insofar as sufficient lubricity is obtained on the sliding surface 21 by the self-lubricating properties of graphite.

In addition, although the degree of graphitization of the thin film 30 in the above embodiment is changed by changing the firing temperature within the range of 1200° C. or higher and lower than 2000° C. and performing firing for 30 minutes in a nitrogen atmosphere, the present invention is not limited thereto. Alternatively, the degree of graphitization may be changed by setting the firing temperature to the same temperature within the range of 1200° C. or higher and lower than 2000° C. and changing the firing time.

In addition, as for the end surface portion 22*a* of the SiC base material 22 coated with the thin film 30, the arithmetic mean roughness Ra of the surface may be 0.1 μm or less depending on the film thickness of the thin film 30.

In addition, although the stationary seal ring 10 and the rotating seal ring 20 are formed of SiC in the above embodiment, the present invention is not limited thereto and any sliding material can be applied insofar as it is used as a sliding material for a mechanical seal. It should be noted that the SiC may include a sintered body using boron, aluminum, carbon, or the like as a sintering aid and a material made of two or more types of phases having different components and compositions, examples of which include SiC in which graphite particles are dispersed and reaction-sintered SiC made of SiC and Si. In addition to the above sliding materials, other ceramics such as alumina, zirconia, silicon nitride (Si3N4), metal materials, resin materials, composite materials, and so on are also applicable.

For example, in a case where the base material of the sliding component is partially stabilized zirconia, the graphite region of the thin film 30 with which the sliding surface is coated is excellent in surface-direction thermal conductivity although the base material itself has excellent toughness along with poor thermal conductivity. As a result, frictional heat resulting from relative sliding with the mating sliding surface can be dissipated in the surface direction and a rise in sliding surface temperature can be suppressed.

REFERENCE SIGNS LIST

10 Stationary seal ring (sliding component)
11 Sliding surface
12 SiC base material (base material)
12*a* End surface portion
12*b* Fine recess
20 Rotating seal ring (sliding component)
21 Sliding surface
22 SiC base material (base material)
22*a* End surface portion
22*b* Fine recess
30 Thin film
30*a* Surface
31 Transfer film
40 High-hardness filler (filler)
41 Low-friction filler (filler)
P30 Shear mass

The invention claimed is:

1. A sliding component having a sliding surface performing relative sliding, wherein a base material of the sliding component is directly coated with a thin film mainly made of graphite, the sliding surface is formed by the thin film, the thin film contains a filler with a dimension equal to or less than a thickness of the thin film, the thin film contains a high-hardness filler harder than the graphite constituting the thin film, the thin film contains a low-friction filler lower in coefficient of friction than the graphite constituting the thin film, content of the high-hardness filler contained in the thin film is between 10 wt % or more and 25 wt % or less, and the low-friction filler contains kaolin clay.

2. The sliding component according to claim 1, wherein the high-hardness filler is lower in hardness than a mating sliding surface with which the sliding surface slides relatively.

* * * * *